United States Patent
Jarvis et al.

(10) Patent No.: US 11,820,667 B2
(45) Date of Patent: Nov. 21, 2023

(54) BIMODAL PRECIPITATED CALCIUM CARBONATE SLURRIES SUITABLE FOR PAPER AND BOARD APPLICATIONS, METHODS FOR MAKING THE SAME AND THEIR USES

(71) Applicant: IMERTECH SAS, Paris (FR)

(72) Inventors: Nigel V. Jarvis, St. Austell (GB); Graham M. Pring, Lostwithiel (GB); Desmond Charles Payton, St. Austell (GB); Andrew Findlay, Truro (GB); Matthew Cheeseman, Camborne (GB)

(73) Assignee: Imertech SAS, Paris (FR)

( * ) Notice: Subject to any disclaimer, the term of this patent is extended or adjusted under 35 U.S.C. 154(b) by 0 days.

(21) Appl. No.: 16/971,606

(22) PCT Filed: Feb. 20, 2019

(86) PCT No.: PCT/EP2019/054220
§ 371 (c)(1),
(2) Date: Aug. 20, 2020

(87) PCT Pub. No.: WO2019/162329
PCT Pub. Date: Aug. 29, 2019

(65) Prior Publication Data
US 2021/0094840 A1    Apr. 1, 2021

(30) Foreign Application Priority Data
Feb. 21, 2018 (EP) ..................... 18157926

(51) Int. Cl.
*C01F 11/18* (2006.01)
*C09D 1/00* (2006.01)
(Continued)

(52) U.S. Cl.
CPC .......... *C01F 11/183* (2013.01); *C01F 11/185* (2013.01); *C09D 1/00* (2013.01);
(Continued)

(58) Field of Classification Search
CPC ... C01F 11/183; C01F 11/185; C01P 2004/45; C01P 2004/53; C01P 2006/12;
(Continued)

(56) References Cited

U.S. PATENT DOCUMENTS 5,861,209 A * 1/1999 Haskins ................. D21H 21/52
                                                              428/340
5,882,396 A * 3/1999 Hiorns .................... C09C 1/025
                                                              106/486
(Continued)

FOREIGN PATENT DOCUMENTS

EP  0777014 A2  6/1997
EP  3156369 A1  4/2017
(Continued)

OTHER PUBLICATIONS

International Search Report and Written Opinion dated Apr. 3, 2019, in International Application No. PCT/EP2019/054220.

Primary Examiner — Shuangyi Abu Ali
(74) Attorney, Agent, or Firm — Finnegan, Henderson, Farabow, Garrett & Dunner, LLP

(57) ABSTRACT

The present application relates to aqueous slurries comprising precipitated calcium carbonates having a bimodal particle size distribution with a first maximum in particle size distribution and a second maximum in particle size distribution, as well as methods for making them and their uses.

12 Claims, 1 Drawing Sheet

(51) Int. Cl.
  *D21H 21/52* (2006.01)
  *D21H 21/28* (2006.01)
  *D21H 19/38* (2006.01)

(52) U.S. Cl.
  CPC .......... *D21H 19/385* (2013.01); *D21H 21/28* (2013.01); *D21H 21/52* (2013.01); *C01P 2004/45* (2013.01); *C01P 2004/53* (2013.01); *C01P 2006/12* (2013.01)

(58) Field of Classification Search
  CPC ........ C09D 1/00; D21H 19/385; D21H 21/28; D21H 21/50; D21H 21/52
  See application file for complete search history.

(56) References Cited

U.S. PATENT DOCUMENTS

| | | |
|---|---|---|
| 6,221,146 B1 | 4/2001 | Fortier et al. |
| 2009/0023816 A1 | 1/2009 | Lefevre et al. |
| 2017/0081519 A1 | 3/2017 | Gerard et al. |
| 2018/0319991 A1* | 11/2018 | Maurer ................ C01F 11/183 |

FOREIGN PATENT DOCUMENTS

| | | | |
|---|---|---|---|
| KR | 2003-0060301 A | 7/2003 | |
| WO | WO-2017064175 A1 * | 4/2017 | .............. C01F 11/18 |

* cited by examiner

BIMODAL PRECIPITATED CALCIUM CARBONATE SLURRIES SUITABLE FOR PAPER AND BOARD APPLICATIONS, METHODS FOR MAKING THE SAME AND THEIR USES

CLAIM FOR PRIORITY

This application is a U.S. national phase entry under 35 U.S.C. § 371 from PCT International Application No. PCT/EP2019/054220, filed Feb. 20, 2019, which claims the benefit of priority of European Patent Application No. 18157926.9, filed Feb. 21, 2018, from both of which this application claims priority and both of which are incorporated herein by reference.

FIELD

This application relates to compositions for use in paper and board applications, the compositions comprising aqueous bimodal precipitated calcium carbonate slurries. This application further relates to methods of making the compositions according to the application and to their uses.

BACKGROUND

Coated paper and coated paperboard are used for a large range of products including packaging, art paper, brochures, magazines, catalogues and leaflets. Such coated paper and coated paperboard are required to have a range of properties which may be imparted by the coatings, including brightness, opacity and sheet gloss, as well as printing performance.

In order to improve brightness and opacity of coated paper and coated paperboard, the use of calcium carbonate as a paper coating pigment is well known in the art. EP 0 768 344 A2 discloses the use of precipitated calcium carbonate (PCC) as a pigment in paper coating compositions, and methods for making such PCCs that are particularly suitable for paper coating applications. The methods for making such PCCs include a comminution step by high shear attrition grinding with an attrition medium. Such a comminution step requires substantial input of energy and time and therefore contributes significantly to the cost of preparing such a PCC.

In the case of coating paperboard, which has a particularly intense base colour, it is essential that the base colour is well hidden by the coating composition in order to achieve an aesthetically acceptable final product. The intense base colour of the paperboard needs to be hidden as well as possible, by using a coating composition in order to achieve satisfactory results.

There is therefore a need to provide improved coating compositions for paper and paperboard.

SHORT DESCRIPTION

The present disclosure is defined in the appended claims.

In particular, the present application is embodied by an aqueous slurry comprising precipitated calcium carbonate having a bimodal particle size distribution with a first maximum in particle size distribution in the range of 1.0 to 3.0 µm and a second maximum in particle size distribution in the range of 0.2 to 1.0 µm. It was found that improved properties could be obtained by using an aqueous slurry in accordance with the present application, wherein the said aqueous slurry may be applied as a coating for paper or paperboard applications. The precipitated calcium carbonate included in the slurry according to the present application may be an unground precipitated calcium carbonate.

According to one particular embodiment, the precipitated calcium carbonate included in the aqueous slurry according to the present application comprises scalenohedral precipitated calcium carbonate. It was found that the use of scalenohedral precipitated calcium carbonate in the aqueous slurries according to the application leads to particularly advantageous properties.

According to one particular embodiment, the solids content of the aqueous slurry according to the present application may be 60 wt.-% or greater. It was found that the slurries according to the application were able to maintain particularly elevated solids content, giving advantages concerning the handling and application of the slurries.

According to one particular embodiment, the precipitated calcium carbonate included in the aqueous slurry according to the present application has a BET surface area in the range of 4 to 12 m$^2$/g. It was found that in this range of surface area, the advantages of the application were particularly pronounced.

According to one particular embodiment, the first maximum in particle size distribution of the precipitated calcium carbonate included in the aqueous slurry according to the present application substantially represents aggregated particles, and the second maximum in particle size distribution represents substantially non-aggregated particles. It was found that such compositions were easy to obtain, using a new combination of known method steps. In one embodiment, the aggregated particles may be made up of primary particles which are substantially the same size as the substantially non-aggregated particles represented by the second maximum in particle size distribution.

According to the present application, the slurries of the application may be applied for the formation of coatings in general, such as coatings for paper, paperboard, board, carton board, or the like. It was found that the slurries were particularly suitable for use in the formation of coatings that require high opacity and/or high brightness, and therefore could be applied in applications where the base colour is particularly intense, such as board coating applications.

Also part of the present application are methods for the preparation of aqueous calcium carbonate slurries of the application. The methods comprise the steps of carbonating an aqueous calcium hydroxide suspension using a starting temperature in the range of 35° C. to 65° C., or in the range of 40° C. to 60° C., with addition of 0.02 to 0.2 wt.-% citric acid, based on the amount of dry PCC to be obtained, followed by dewatering of the carbonated product obtained in the previous step to obtain a slurry having a solids content of 60 wt.-% or greater, using mechanical or thermal dewatering equipment, to obtain a filter cake, and finally transferring the obtained filter cake to a high speed dispersing unit and addition of a polycarboxylate dispersing agent in an amount of 0.2 to 1.2 wt.-%, based on the sum of active dispersant and solids amount of the filter cake, to produce a homogeneous slurry. It was found that using the method according to the application, the slurries of the application comprising the precipitated calcium carbonate could be obtained, without employing a grinding step.

According to one particular embodiment, the amount of citric acid employed may be in the range of 0.05 to 0.1 wt.-%, based on the amount of dry PCC to be obtained. It was found that such amounts were helpful to obtain a product with particles particularly within certain desired ranges of solids loading, particle size distribution and with the desired crystallography.

According to one particular embodiment, the dewatering equipment to obtain the filter cake is a mechanical filter press employed at a pressure of 12 bar or higher under air blow. It was found that such conditions were particularly advantageous to obtain the desired product.

According to one particular embodiment, the polycarboxylate employed may be a homopolymer or copolymer of acrylic acid. It was found that this was suitable to use from a handling point of view and to obtain the desired product. In one embodiment, the homopolymer and/or copolymer of acrylic acid may be totally or partially neutralised using a neutralisation agent. The neutralisation agent may be at least one selected from the group consisting of sodium hydroxide, potassium hydroxide, magnesium hydroxide and ammonium hydroxide.

According to one particular embodiment, the product obtained from the method according to the application may be a homogeneous slurry comprising precipitated calcium carbonate having a bimodal particle size distribution with a first maximum in particle size distribution in the range of 1.0 to 3.0 μm and a second maximum in particle size distribution in the range of 0.2 to 1.0 μm. The product obtained is the product of the present application.

Also part of the present application is the use of the aqueous slurry according to the application, or the use of the method according to the application, in the production of paper, board, carton board, or cardboard.

Also part of the present application are methods of hiding the base colour of raw paper, board, carton board, or cardboard, including the step of applying the aqueous slurry according to the present application, or including the method steps of the method according to the present application.

Also part of the present application are methods of improving the board brightness and/or opacity of a base paper, board, carton board, or cardboard, comprising the step of coating the said base paper, board, carton board, or cardboard with applying the aqueous slurry according to the present application, or including the method steps of the method according to the present application.

SHORT DESCRIPTION OF THE FIGURES

The application will be further illustrated by reference to the following figures.

It is understood that the following description and references to the figures concern exemplary embodiments of the present application and shall not be limiting the scope of the claims.

DETAILED DESCRIPTION

The present application according to the appended claims provides aqueous slurries of precipitated calcium carbonate for use in the formation of paper and board coatings. The precipitated calcium carbonate contained in the slurries has a bimodal particle distribution, as measured by sedigraph, and may be obtained in accordance with methods as disclosed herein. Finally, the methods and slurries in accordance with the present application may be employed in hiding the base colour of raw paper, board, carton board, or cardboard, or in improving the board brightness and/or opacity of a base paper, board, carton board, or cardboard.

As used herein, particle size distributions were measured in accordance with methods known to the skilled person in the art. Unless otherwise mentioned, the properties were measured by sedimentation of the particulate material in a fully dispersed condition in an aqueous medium using a "Sedigraph 5100" machine as supplied by Micrometrics Instruments Corporation, Norcross, Ga., USA, referred to herein as a "Micrometrics Sedigraph 5100 unit".

As used herein, the term "bimodal particle size distribution" designates a particle size distribution according to which there are two separate particle sizes representing local maxima in the particle size distribution curve. As used herein the first and second maxima are represented as separate peaks in the particle size distribution curve.

Processes for making precipitated calcium carbonates (PCC) result in very pure calcium carbonate crystals and water. The crystals can be produced in a variety of different shapes and sizes, depending on the specific reaction process that is used. The three main forms of PCC crystals are aragonite, rhombohedral and scalenohedral, all of which are suitable for use in embodiments of the present application, including mixtures thereof. In one particular embodiment of the present application, the PCC crystals are scalenohedral. The PCC form achieved in practice is unlikely to be 100% of the scalenohedral form. It is quite usual for one PCC crystal form even when predominant to be mixed with other forms. Such mixed forms will give suitably improved product properties. In one embodiment at least 50 wt.-%, or at least 80 wt.-% of the crystals in the PCC product according to the present application are of the scalenohedral form, for example at least 85 wt.-%, or at least 90 wt.-%, or at least 95 wt.-%, or at least 98 wt.-%, or even at least 99 wt.-%.

Figure 1:
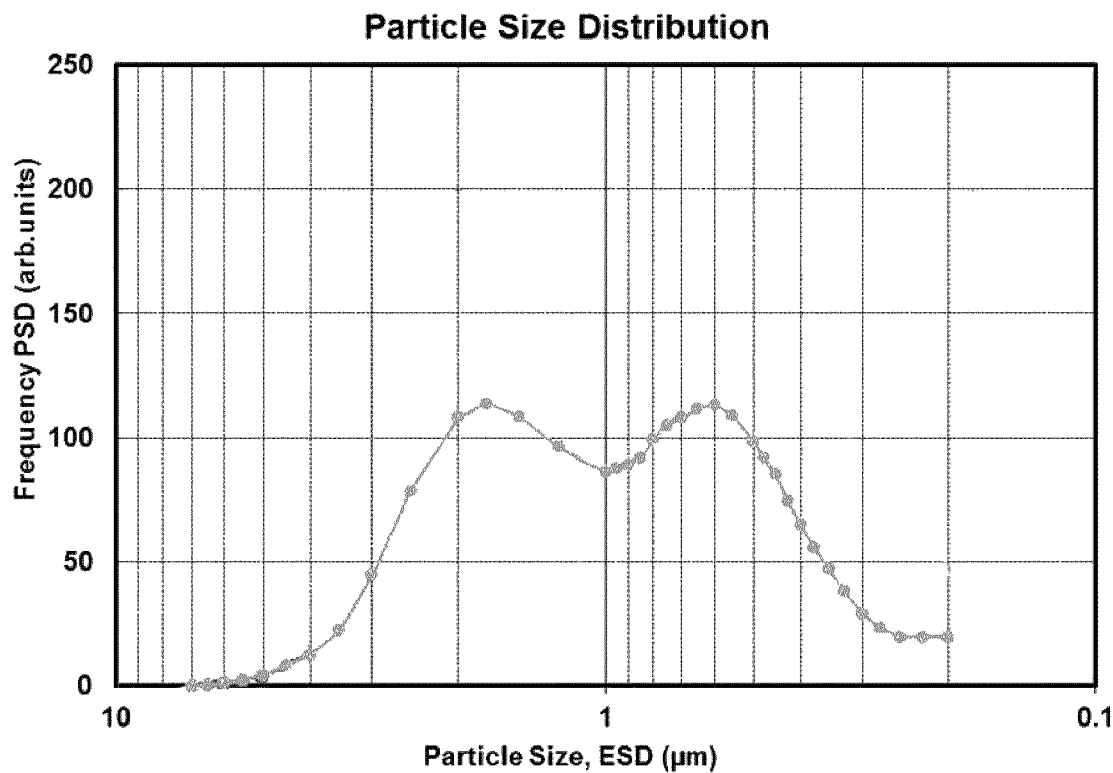
FIG. 1 is a graph representing the particle size distribution of the solids content of a slurry in accordance with the present application, as measured in accordance with Sedigraph.

In accordance with the present application, all the PCC slurries have a bimodal particle size distribution, as represented in an exemplary fashion in FIG. 1. As can be seen in FIG. 1, the particle mixture represented in the graph has a first maximum at about 1.8 μm and a second maximum at about 0.6 μm.

In accordance with the present application, the particles size distribution may be such that the first maximum is in the range of 1.0 to 3.0 μm, such as for example about 1.0 μm, or about 1.00 μm, or about 1.1 μm, or about 1.2 μm, or about 1.3 μm, or about 1.4 μm, or about 1.5 μm, or about 1.6 μm, or about 1.7 μm, or about 1.8 μm, or about 1.9 μm, or about 2 μm, or about 2.0 μm, or about 2.1 μm, or about 2.2 μm, or about 2.3 μm, or about 2.4 μm, or about 2.5 μm, or about 2.6 μm, or about 2.7 μm, or about 2.8 μm, or about 2.9 μm, or about 3 μm, or about 3.0 μm. For example, the first maximum may be less than 3.0 μm and more than 1.1 μm, or more than 1.2 μm, or more than 1.3 μm, or more than 1.4 μm, or more than 1.5 μm, or more than 1.6 μm, or more than 1.7 μm, or more than 1.8 μm, or more than 1.9 μm, or more than 2 μm, or more than 2.0 μm, or more than 2.1 μm, or more than 2.2 μm, or more than 2.3 μm, or more than 2.4 μm, or more than 2.5 μm, or more than 2.6 μm, or more than 2.7 μm, or more than 2.8 μm, or more than 2.9 μm. For example the first maximum may be more than 1.0 μm and less than 3 μm, or less than 3.0 μm, or less than 2.9 μm, or less than 2.8 μm, or less than 2.7 μm, or less than 2.6 μm, or less than 2.5 μm, or less than 2.4 μm, or less than 2.3 μm, or less than 2.2 μm, or less than 2.1 μm, or less than 2 μm, or less than 2.0 μm, or less than 1.9 μm, or less than 1.8 μm, or less than 1.7 μm, or less than 1.6 μm, or less than 1.5 μm, or less than 1.4 μm, or less than 1.3 µm, or less than 1.2 µm, or less than 1.1 µm. In accordance with one embodiment, the first maximum is in the range of 1.5 µm to 2.0 µm.

In accordance with the present application, the particle size distribution may be such that the second maximum is in the range of 0.2 to 1.0 µm, such as for example about 0.2 µm, or about 0.20 µm, or about 0.3 µm, or about 0.4 µm, or about 0.5 µm, or about 0.6 µm, or about 0.7 µm, or about 0.8 µm, or about 0.9 µm, or about 1.0 µm, or about 1.00 µm. For example the second maximum may be more than 0.2 µm and less than 1.0 µm, or less than 1.00 µm, or less than 0.95 µm, or less than 0.90 µm, or less than 0.85 µm, or less than 0.80 µm, or less than 0.75 µm, or less than 0.70 µm, or less than 0.65 µm, or less than 0.60 µm, or less than 0.55 µm, or less than 0.50 µm, or less than 0.45 µm, or less than 0.40 µm, or less than 0.35 µm, or less than 0.30 µm, or less than 0.25 µm. For example the second maximum may be less than 1.0 µm, and more than 0.20 µm, or more than 0.25 µm, or more than 0.30 µm, or more than 0.35 µm, or more than 0.40 µm, or more than 0.45 µm, or more than 0.50 µm, or more than 0.55 µm, or more than 0.60 µm, or more than 0.65 µm, or more than 0.70 µm, or more than 0.75 µm, or more than 0.80 µm, or more than 0.85 µm, or more than 0.90 µm, or more than 0.95 µm. In accordance with one embodiment, the second maximum is in the range of 0.5 µm to 0.7 µm In accordance with one embodiment of the present application the aqueous slurry may have a solids content of 60 wt.-% or higher, such as for example 62 wt.-% or higher, or 64 wt.-% or higher, or 66 wt.-% or higher, or 68 wt.-% or higher, or 70 wt.-% or higher, or 71 wt.-% or higher, or 72 wt.-% or higher. While there is no specific upper limit to the solids content of the slurry in accordance with the present application, it is known to the skilled person in the art that a practical maximum to the solids loading is achieved when the slurry becomes non-homogenous. The maximum solids content may depend both on the dewatering equipment chosen and the expectation of having a mineral slurry with acceptable viscosity. The skilled person in the art would normally consider an acceptable viscosity a viscosity that allows a slurry to be pumped and transferred easily. The maximal solids loading may be as high as about 73 wt.-%, or about 74 wt.-%, or about 75 wt.-%, or about 76 wt.-%, or about 77 wt.-%, or about 78 wt.-%, or about 79 wt.-%, or even about 80 wt.-%. According to one embodiment of the present application, the solids content may be in the range of 68 wt.-% to 76 wt.-%.

In accordance with one embodiment of the present application, the PCC in the slurry will have a BET surface area in the range of 4 to 12 $m^2/g$. For example, the BET surface area may be about 4 $m^2/g$, or about 4.0 $m^2/g$, or about 5 $m^2/g$, or about 6 $m^2/g$, or about 7 $m^2/g$, or about 8 $m^2/g$, or about 9 $m^2/g$, or about 10 $m^2/g$, or about 11 $m^2/g$, or about 12 $m^2/g$, or about 12.0 $m^2/g$. For example, the BET surface area may be 4 $m^2/g$ or more and less than 12 $m^2/g$, or less than 12.0 $m^2/g$, or less than 11 $m^2/g$, or less than 10 $m^2/g$, or less than 9 $m^2/g$, or less than 8 $m^2/g$, or less than 7 $m^2/g$, or less than 6 $m^2/g$, or less than 5 $m^2/g$. For example, the BET surface area may be 12 $m^2/g$ or less and more than 4 $m^2/g$, or more than 4.0 $m^2/g$, or more than 5 $m^2/g$, or more than 6 $m^2/g$, or more than 7 $m^2/g$, or more than 8 $m^2/g$, or more than 9 $m^2/g$, or more than 10 $m^2/g$, or more than 11 $m^2/g$.

According to one aspect of the present application, the coarse particle fraction in the bimodal particle size distribution of the calcium carbonate in the aqueous slurry may be constituted of agglomerates, wherein the particle size indicated and detected by the sedigraph measurement is the particle size of the agglomerates. The agglomerates are constituted of fine primary particles, which have a particle size in the range of the fine particle fraction in the bimodal particle size distribution of the calcium carbonate in the aqueous slurry. In other words, the aqueous slurry may comprise fine particles and agglomerated fine particles, wherein the agglomerated fine particles correspond to the coarse particle fraction detected in the bimodal particle size distribution. Therefore the aqueous slurry according to the application may be an unground slurry, since grinding of the slurry may cause the agglomerates to disintegrate into primary particles, and lead to the loss of the bimodal particle size distribution.

According to one aspect of the present application, the aqueous slurry may have admixed to it further particulate components suitable for use in paper coating or paperboard coating. These further particulate components may be selected from the group consisting of titanium dioxide, calcined clay, talc, calcium sulphate, kaolin clay, calcined kaolin and precipitated or ground calcium carbonate, or mixtures thereof. Such a pigment mixture may comprise from 5 wt.-% to 99 wt.-%, or 40 wt.-% to 70 wt.-% of its solids content as calcium carbonate particles in accordance with the present application.

According to a further aspect of the present application, paper coating compositions are disclosed, comprising the aqueous slurry according to any one of the previous claims, and optionally one or more selected from adhesives, pigments, and thickeners. The adhesive may be one of the known paper coating adhesives employed in the art, e.g. chosen from the group consisting of starches, proteinaceous adhesives such as casein and latices of, for example, styrene butadiene rubbers and acrylic polymers. The thickener may comprise one or more substances employed as thickeners in the prior art, e.g. sodium carboxymethyl cellulose or synthetic acrylic thickeners.

According to a further aspect of the present application, the aqueous calcium carbonate slurries may be obtained by the method in accordance with the application. General methods for the formation of PCCs are well known to the skilled person in the art. TAPPI Monograph Series No 30, "Paper Coating Pigments", pages 34-35, the contents of which are incorporated herein by reference, describes the three main commercial processes for preparing precipitated calcium carbonate which is suitable for use in preparing products for use in the paper industry, but may also be used in connection with the embodiments of the present application. In all three processes, limestone is first calcined to produce quicklime, and the quicklime is then slaked in water to yield calcium hydroxide or milk of lime. In the first process, the milk of lime is directly carbonated with carbon dioxide gas. This process has the advantage that no by-product is formed, and it is relatively easy to control the properties and purity of the calcium carbonate product. In the second process, the milk of lime is contacted with soda ash to produce, by double decomposition, a precipitate of calcium carbonate and a solution of sodium hydroxide. The sodium hydroxide should be substantially completely separated from the calcium carbonate if this process is to be commercially attractive. In the third main commercial process, the milk of lime is first contacted with ammonium chloride to give a calcium chloride solution and ammonia gas. The calcium chloride solution is then contacted with soda ash to produce, by double decomposition, precipitated calcium carbonate and a solution of sodium chloride.

According to the present application, an aqueous calcium hydroxide suspension is carbonated at a starting temperature of 35° C. to 65° C., or in the range of 40° C. to 60° C., or in the range of 45° C. to 55° C., with addition of citric acid, for example by blowing a carbon dioxide containing gas. The citric acid is added in an amount of 0.02 wt.-% to 0.2 wt.-% based on the amount of dry PCC to be obtained. Addition of citric acid may occur prior to the start of carbonation, or during carbonation. The product obtained is then dewatered in order to obtain a slurry with a high solids content, using mechanical or thermal dewatering equipment. This forms a filter cake. This filter cake is then made down by addition of a dispersant. In this step the filter cake is transformed into a homogeneous slurry with the help of a polycarboxylate dispersing agent, for example using a high speed dispersing unit such as Cellier, Dispercel or similar, for a period long enough to produce a homogenous slurry. The polycarboxylate dispersing agent is used in an amount of 0.2 wt.-% to 1.2 wt.-%, for example in an amount of 0.4 wt.-% to 0.8 wt.-%, based on the sum of dispersing agent and solids content of the composition.

The resultant aqueous has a bimodal particle size distribution wherein the coarse fraction represents agglomerates of primary particles, and the fine fraction represents the non-agglomerated primary particles. According to the application the bimodal particle size distribution may have a first maximum in particle size distribution in the range of 1.0 to 3.0 µm, representing agglomerated primary particles, and a second maximum in particle size distribution in the range of 0.2 to 1.0 µm, representing non-agglomerated primary particles.

The amount of citric acid employed in accordance with the method of the present application may be in the range of 0.02 wt.-% to 0.2 wt.-%, based on the amount of calcium hydroxide, or in the range of 0.05 wt.-% to 0.1 wt.-%, or 0.10 wt.-% to 0.15 wt.-%. For example, the amount of citric acid may be about 0.02 wt.-%, or about 0.03 wt.-%, or about 0.04 wt.-%, or about 0.05 wt.-%, or about 0.06 wt.-%, or about 0.07 wt.-%, or about 0.08 wt.-%, or about 0.09 wt.-%, or about 0.1 wt.-%, or about 0.10 wt.-%, or about 0.11 wt.-%, or about 0.12 wt.-%, or about 0.13 wt.-%, or about 0.14 wt.-%, or about 0.15 wt.-%, or about 0.16 wt.-%, or about 0.17 wt.-%, or about 0.18 wt.-%, or about 0.19 wt.-%, or about 0.20 wt.-%, or about 0.2 wt.-%, based on the amount of dry PCC to be obtained. For example, the amount of citric acid may be more than 0.02 wt.-% but less than 0.20 wt.-%, or less than 0.19 wt.-%, or less than 0.18 wt.-%, or less than 0.17 wt.-%, or less than 0.16 wt.-%, or less than 0.15 wt.-%, or less than 0.14 wt.-%, or less than 0.13 wt.-%, or less than 0.12 wt.-%, or less than 0.11 wt.-%, or less than 0.10 wt.-%, or less than 0.1 wt.-%, or less than 0.09 wt.-%, or less than 0.08 wt.-%, or less than 0.07 wt.-%, or less than 0.06 wt.-%, or less than 0.05 wt.-%, or less than 0.04 wt.-%, or less than 0.03 wt.-%, based on the amount of dry PCC to be obtained. For example, the amount of citric acid may be less than 0.20 wt.-% but more than 0.02 wt.-%, or more than 0.03 wt.-%, or more than 0.04 wt.-%, or more than 0.05 wt.-%, or more than 0.06 wt.-%, or more than 0.07 wt.-%, or more than 0.08 wt.-%, or more than 0.09 wt.-%, or more than 0.1 wt.-%, or more than 0.10 wt.-%, or more than 0.11 wt.-%, or more than 0.12 wt.-%, or more than 0.13 wt.-%, or more than 0.14 wt.-%, or more than 0.15 wt.-%, or more than 0.16 wt.-%, or more than 0.17 wt.-%, or more than 0.18 wt.-%, or more than 0.19 wt.-%, based on the amount of dry PCC to be obtained.

In the method according to the first aspect of the present application the aqueous suspension formed in the carbonation step may have a (dry weight) solids concentration of from 10 wt.-% to 25 wt.-%.

In accordance with one embodiment of the present application, the dewatering step of the aqueous suspension formed in the carbonation step may be carried out using a mechanical filter press under air blow, for example using a mechanical filter press at a pressure of 12 bar or more under air blow. For example, the mechanical filter press may be employed at a pressure of 14 bar or more, or at a pressure of 16 bar or more. While the method according to the present application does not impose a maximum pressure to be used for the mechanical filter press, there may be practical or technical considerations leading to an upper limit. For example, the maximum pressure may be applied at about 30 bar, or about 25 bar. For example, the pressure applied may be in the range of 12 bar to 30 bar, or in the range of 14 bar to 25 bar, or in the range of 16 bar to 20 bar. The filter press employed may be an automatic tower filter fitted with recessed-plate diaphragm filters and horizontally oriented chambers. Typically the filters have a continuous filter cloth for thorough cloth washing and efficient cake discharge. Process slurry is pumped into the filter chambers and the solids begin to form. As the pumping pressure increases, the filtrate is forced through the cloth. High-pressure air or water inflates the diaphragm located above each chamber, so reducing the chamber volume and squeezing the solids to remove more filtrate. Compressed air is blown through the solids for final dewatering. The filter plates open and the dewatered solids are conveyed out on the moving filter cloth. A wash unit sprays both sides of the cloth with high-pressure water.

It is thought that the dewatering step leads to the breaking up of aggregated particles formed during the previous carbonation step. Accordingly, it may be possible to adapt the dewatering step conditions in order to control the de-aggregation of aggregated particles and therefore influence the relative amounts of aggregated particles appearing as the first maximum in the particle size distribution and discrete non-aggregated particles appearing as the second maximum in the particle size distribution.

In accordance with one embodiment of the present application, the polycarboxylate dispersing agent may be employed in an amount of 0.2 wt.-% to 1.2 wt.-%, based on the sum of dispersing agent and solids content of the composition. For example, the amount of polycarboxylate dispersing agent employed may be about 0.2 wt.-%, or about 0.20 wt.-%, or about 0.3 wt.-%, or about 0.4 wt.-%, or about 0.5 wt.-%, or about 0.6 wt.-%, or about 0.7 wt.-%, or about 0.8 wt.-%, or about 0.9 wt.-%, or about 1.0 wt.-%, or about 1 wt.-%, or about 1.1 wt.-%, or about 1.2 wt.-%, or about 1.20 wt.-%, based on the sum of dispersing agent and solids content of the composition. For example, the polycarboxylate dispersing agent may be employed in an amount of 0.2 wt.-% or more, and less than 1.2 wt.-%, or less than 1.20 wt.-%, or less than 1.1 wt.-%, or less than 1.0 wt.-%, or less than 1 wt.-%, or less than 0.9 wt.-%, or less than 0.8 wt.-%, or less than 0.7 wt.-%, or less than 0.6 wt.-%, or less than 0.5 wt.-%, or less than 0.4 wt.-%, or less than 0.3 wt.-%, based on the sum of dispersing agent and solids content of the composition. For example, the polycarboxylate dispersing agent may be employed in an amount of 1.2 wt.-% or less, and more than 0.2 wt.-%, or more than 0.20 wt.-%, or more than 0.3 wt.-%, or more than 0.4 wt.-%, or more than 0.5 wt.-%, or more than 0.6 wt.-%, or more than 0.7 wt.-%, or more than 0.8 wt.-%, or more than 0.9 wt.-%, or more than 1 wt.-%, or more than 1.0 wt.-%, or more than 1.1 wt.-%, based on the sum of dispersing agent and solids content of the composition. According to one embodiment, the polycarboxylate dispersing agent may be employed in an amount of 0.4 wt.-% to 0.8 wt.-%, based on the sum of dispersing agent and solids content of the composition.

The polycarboxylate dispersing agent employed in accordance with one aspect of the present application may be a homopolymer or copolymer which contains a monomer unit comprising a vinyl or olefinic group which is substituted with at least one carboxylic acid group, or a water soluble salt thereof. Examples of suitable monomers are acrylic acid, methacrylic acid, itaconic acid, crotonic acid, fumaric acid, maleic acid, maleic anhydride, isocrotonic acid, undecylenic acid, angelic acid and hydroxyacrylic acid. For example, the polycarboxylate dispersing agent may be selected from a homopolymer of acrylic acid, a copolymer of acrylic acid, or a mixture of homopolymer and copolymer of acrylic acid. The number average molecular weight of the polycarboxylate dispersing agent should be not greater than 20,000, for example in the range from 700 to 10,000, as measured by the method of gel permeation chromatography using a low angle laser light scattering detector. According to one embodiment, the homopolymer and/or copolymer of acrylic acid may be neutralised by a neutralising agent. The neutralising agent may be selected from the group consisting of sodium hydroxide, potassium hydroxide, magnesium hydroxide and ammonium hydroxide, or mixtures thereof. The neutralisation agent may be employed in such an amount to partially or fully neutralise the said homopolymer and/or copolymer of acrylic acid.

Figure 2:
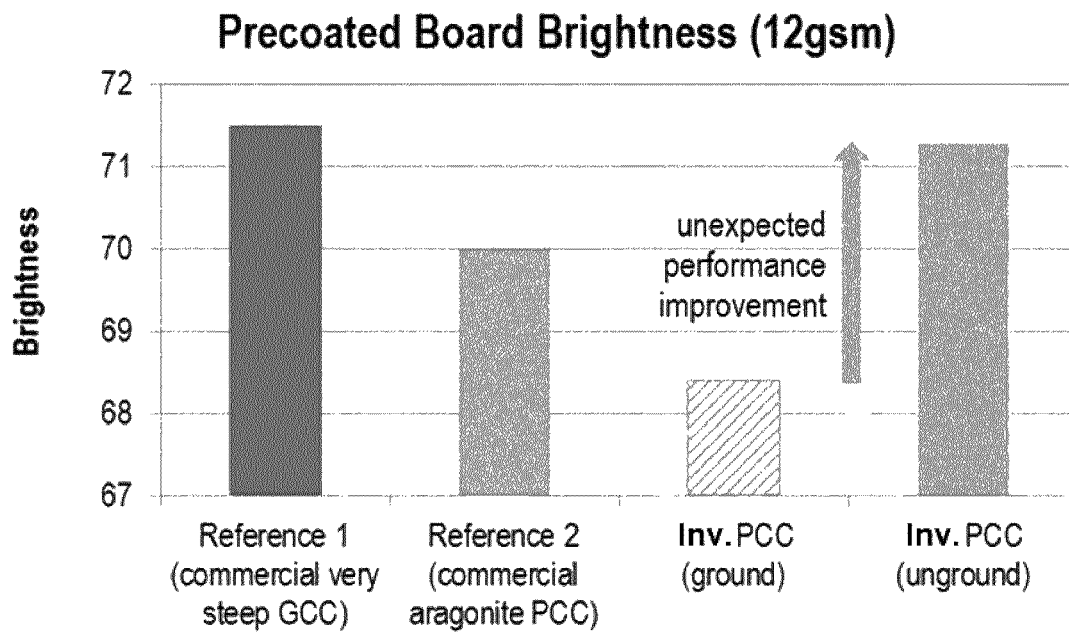
FIG. 2 represents experimental data obtained for the brightness of coated paper board using the composition in accordance with the present application, prior art compositions, and the composition of the present application after grinding.

It was found that when the method according to the present application was employed, aqueous slurries of particulate calcium carbonate could be obtained, wherein the calcium carbonate particles had a bimodal particle size distribution, in accordance with the product of the present application. This was confirmed by sedigraph analysis, as shown in FIG. 1. It was then found that the products according to the present application, when employed as coating compositions for paper or paperboard helped to obtain improved brightness and opacity over the prior art compositions "Reference Material 1" and "Reference Material 2". In particular, the particulate composition as obtained in accordance with the method of the application did not require grinding in order to obtain the desired properties. On the contrary, when the product was ground, de-agglomeration of the agglomerated particles occurred, leading to a loss of the bimodal particle size distribution and reduced brightness values measured after application of a pre-coating composition onto a paperboard sample as illustrated in FIG. 2.

Various coating compositions in accordance with the present application and the prior art were tested as follows. Coatings were applied in the laboratory using a K303 Multi-coater (RK Print Coat Instruments) with a metering rod in order to achieve a range of coatweights from 7 to 15 gsm, by changing rod and speed. The baseboard used was a commercial uncoated base board with low brightness. The brightness of the coated boards was then measured and interpolated to a coating weight of 12 gsm.

Reference material 1 was a very steep GCC "Coverplus" from Calcit, having a $d_{50}$ of 0.64 μm, a brightness (ISO) of 93.3, and a steepness of 57. Reference material 2 was an aragonite PCC "Omyaprime HO 40" from Omya, having a $d_{50}$ of 0.43 μm, a brightness (ISO) of 95.8, and a steepness of 51. The coating compositions employed all consisted of 100 weight portions calcium carbonate, 10 weight portions latex binder (DL1066), and 0.5 weight portions thickener (CMC FF10). The slurries all had a solids content of 55 wt.-% and a pH value of 9.

It should be noted that the present application may comprise any combination of the features and/or limitations referred to herein, except for combinations of such features which are mutually exclusive. The foregoing description is directed to particular embodiments of the present application for the purpose of illustrating it. It will be apparent, however, to one skilled in the art, that many modifications and variations to the embodiments described herein are possible. All such modifications and variations are intended to be within the scope of the present application, as defined in the appended claims.

The invention claimed is:

1. An aqueous slurry comprising precipitated calcium carbonate having a bimodal particle size distribution with
   a first maximum in particle size distribution in the range of 1.0 to 3.0 μm as measured by Sedigraph and
   a second maximum in particle size distribution in the range of 0.2 to 1.0 μm, as measured by Sedigraph;
   wherein the said first maximum in particle size distribution substantially represents aggregated particles, and wherein the said second maximum in particle size distribution represents substantially non-aggregated particles.

2. An aqueous slurry according to claim 1, wherein the precipitated calcium carbonate is scalenohedral precipitated calcium carbonate.

3. An aqueous slurry according to claim 1, having a solids content of 60 wt. % or greater.

4. An aqueous slurry according to claim 1, wherein the precipitated calcium carbonate has a BET surface area in the range of 4 to 12 $m^2/g$.

5. An aqueous slurry according to claim 1, wherein the said aggregated particles are made up of primary particles which are substantially the same size as the substantially non-aggregated particles represented by the said second maximum in particle size distribution.

6. A paper coating composition comprising the aqueous slurry according to claim 1.

7. An aqueous slurry according to claim 3, wherein the precipitated calcium carbonate has a BET surface area in the range of 4 to 12 $m^2/g$.

8. An aqueous slurry according to claim 5, wherein
   the precipitated calcium carbonate is scalenohedral precipitated calcium carbonate,
   the precipitated calcium carbonate has a BET surface area in the range of 4 to 12 $m^2/g$, and
   the slurry has a solids content of 60 wt.-% or greater.

9. A method comprising coating the surface of an article with an aqueous slurry according to claim 1.

10. The method of claim 9, wherein the article comprises a raw paper board, raw carton board, or raw cardboard.

11. The method of claim 10, wherein the coating step hides the base color of the raw paper board, raw carton board, or raw cardboard.

12. The method of claim 9, wherein
    the article is a base paper, board, carton board, or cardboard, and
    the coating step improves the board brightness and/or opacity of the base paper, board, carton board, or cardboard.

* * * * *